(12) United States Patent
DeWeese et al.

(10) Patent No.: US 9,401,915 B2
(45) Date of Patent: Jul. 26, 2016

(54) SECONDARY DEVICE AS KEY FOR AUTHORIZING ACCESS TO RESOURCES

(71) Applicant: SkySocket, LLC, Atlanta, GA (US)

(72) Inventors: William DeWeese, Haltom City, TX (US); Erich Stuntebeck, Marietta, GA (US)

(73) Assignee: AirWatch LLC, Palo Alto, CA (US)

( * ) Notice: Subject to any disclaimer, the term of this patent is extended or adjusted under 35 U.S.C. 154(b) by 92 days.

(21) Appl. No.: 14/083,718

(22) Filed: Nov. 19, 2013

(65) Prior Publication Data

US 2014/0282846 A1    Sep. 18, 2014

Related U.S. Application Data

(63) Continuation-in-part of application No. 13/841,853, filed on Mar. 15, 2013.

(51) Int. Cl.
*H04L 29/06* (2006.01)

(52) U.S. Cl.
CPC ......... *H04L 63/0853* (2013.01); *H04L 63/0428* (2013.01); *H04L 63/102* (2013.01); *H04L 63/20* (2013.01)

(58) Field of Classification Search
CPC ............ H04L 63/0853; H04L 63/0428; H04L 63/102; H04L 63/20
USPC ........................................... 726/1, 4; 380/44
See application file for complete search history.

(56) References Cited

U.S. PATENT DOCUMENTS

| | | | |
|---|---|---|---|
| 5,574,786 A | 11/1996 | Dayan et al. | |
| 5,987,609 A | 11/1999 | Hasebe | |
| 6,021,492 A | 2/2000 | May | |
| 6,023,708 A | 2/2000 | Mendez et al. | |
| 6,078,260 A | 6/2000 | Desch | |
| 6,085,192 A | 7/2000 | Mendez et al. | |
| 6,131,096 A | 10/2000 | Ng et al. | |
| 6,131,116 A | 10/2000 | Riggins et al. | |
| 6,151,606 A | 11/2000 | Mendez | |
| 6,233,341 B1 | 5/2001 | Riggins | |
| 6,560,772 B1 | 5/2003 | Slinger | |
| 6,708,221 B1 | 3/2004 | Mendez et al. | |
| 6,714,859 B2 | 3/2004 | Jones | |
| 6,726,106 B1 | 4/2004 | Han et al. | |

(Continued)

FOREIGN PATENT DOCUMENTS

| | | |
|---|---|---|
| CA | 2149337 A1 | 6/1994 |
| GB | 2346716 A | 8/2000 |

(Continued)

OTHER PUBLICATIONS

International Search Report for PCT/US2014/025256 mailed Jul. 3, 2014.

(Continued)

*Primary Examiner* — David Garcia Cervetti (57) ABSTRACT

A secondary device may be used to provide access to resources to a primary device. Upon receiving an authorization indication at a device, a registration key based on the authorization indication, a user identifier, and a property of the device may be created. Upon determining whether access to at least one resource is permitted according to the registration key the device may be permitted to access the at least one resource.

19 Claims, 5 Drawing Sheets

(56) References Cited

U.S. PATENT DOCUMENTS

| | | |
|---|---|---|
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |
| 6,904,359 B2 | 6/2005 | Jones |
| 6,965,876 B2 | 11/2005 | Dabbiere |
| 6,995,749 B2 | 2/2006 | Friend |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B2 | 5/2008 | Riggins |
| 7,430,757 B1 | 9/2008 | Chari et al. |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,496,957 B2 | 2/2009 | Howard et al. |
| 7,539,665 B2 | 5/2009 | Mendez |
| 7,543,146 B1 | 6/2009 | Karandikar et al. |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B1 | 4/2010 | Maurya et al. |
| 7,702,785 B2 | 4/2010 | Bruton, III et al. |
| 7,735,112 B2 | 6/2010 | Kim et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,921,155 B2 * | 4/2011 | Harrow .................. H04L 47/10 709/203 |
| 7,970,386 B2 | 6/2011 | Bhat et al. |
| 7,991,697 B2 | 8/2011 | Fransdonk |
| 8,001,082 B1 | 8/2011 | Muratov |
| 8,012,219 B2 | 9/2011 | Mendez et al. |
| 8,041,776 B2 | 10/2011 | Friedman et al. |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,108,687 B2 | 1/2012 | Ellis et al. |
| 8,117,344 B2 | 2/2012 | Mendez et al. |
| 8,150,431 B2 | 4/2012 | Wolovitz et al. |
| 8,155,587 B2 * | 4/2012 | Sasai .................. H04W 48/18 455/41.1 |
| 8,214,862 B1 | 7/2012 | Lee et al. |
| 8,225,381 B2 | 7/2012 | Lemke |
| 8,276,209 B2 * | 9/2012 | Knibbeler ............ H04L 63/0492 380/258 |
| 8,411,834 B2 * | 4/2013 | Gopinath ............ H04M 3/42263 379/201.01 |
| 8,423,511 B1 * | 4/2013 | Bhatia .................. G06F 21/6218 707/654 |
| 8,456,293 B1 | 6/2013 | Trundle et al. |
| 8,472,874 B2 * | 6/2013 | Tang .................. H04W 8/005 340/5.53 |
| 8,687,536 B2 * | 4/2014 | Michaelis ............ H04L 12/185 370/312 |
| 8,843,413 B2 * | 9/2014 | Robert .................. G06F 21/10 705/51 |
| 8,933,778 B2 * | 1/2015 | Birkel .................. B60R 25/24 340/5.54 |
| 8,934,841 B2 * | 1/2015 | Koh .................. H04L 63/0492 455/41.1 |
| 2002/0013721 A1 | 1/2002 | Dabbiere et al. |
| 2002/0049580 A1 | 4/2002 | Kutaragi et al. |
| 2002/0157019 A1 | 10/2002 | Kadyk et al. |
| 2003/0065950 A1 | 4/2003 | Yarborough |
| 2003/0110084 A1 | 6/2003 | Eberhard et al. |
| 2003/0204716 A1 | 10/2003 | Rockwood et al. |
| 2004/0003133 A1 * | 1/2004 | Pradhan .................. H04W 48/08 719/318 |
| 2004/0008113 A1 * | 1/2004 | Pradhan .................. G01S 5/0289 340/539.26 |
| 2004/0123153 A1 | 6/2004 | Wright et al. |
| 2004/0181687 A1 | 9/2004 | Nachenberg et al. |
| 2004/0224703 A1 | 11/2004 | Takaki et al. |
| 2005/0005113 A1 * | 1/2005 | Dillon .................. G06F 21/31 713/168 |
| 2005/0097032 A1 | 5/2005 | Benco et al. |
| 2005/0097327 A1 | 5/2005 | Ondet et al. |
| 2005/0198029 A1 * | 9/2005 | Pohja .................. H04M 1/7253 |
| 2005/0246192 A1 | 11/2005 | Jauffred et al. |
| 2006/0013566 A1 | 1/2006 | Nakamura |
| 2006/0149846 A1 * | 7/2006 | Schuba .................. G06F 21/36 709/229 |
| 2006/0190984 A1 | 8/2006 | Heard et al. |
| 2007/0033397 A1 | 2/2007 | Phillips, II et al. |
| 2007/0130473 A1 | 6/2007 | Mazotas et al. |
| 2007/0136492 A1 | 6/2007 | Blum et al. |
| 2007/0156897 A1 | 7/2007 | Lim |
| 2007/0174433 A1 | 7/2007 | Mendez et al. |
| 2007/0261099 A1 | 11/2007 | Broussard et al. |
| 2007/0288637 A1 | 12/2007 | Layton et al. |
| 2007/0300070 A1 * | 12/2007 | Shen-Orr ............ G06F 21/33 713/176 |
| 2008/0010689 A1 | 1/2008 | Ooi et al. |
| 2008/0014947 A1 * | 1/2008 | Carnall .................. G08B 21/22 455/437 |
| 2008/0133712 A1 | 6/2008 | Friedman et al. |
| 2008/0134305 A1 | 6/2008 | Hinton et al. |
| 2008/0134347 A1 | 6/2008 | Goyal et al. |
| 2008/0201453 A1 | 8/2008 | Assenmacher |
| 2008/0268895 A1 * | 10/2008 | Foxenland ............ G01C 21/20 455/550.1 |
| 2008/0291897 A1 * | 11/2008 | Sourani .................. H04Q 1/145 370/352 |
| 2008/0307219 A1 | 12/2008 | Karandikar |
| 2008/0318548 A1 | 12/2008 | Bravo et al. |
| 2009/0036111 A1 | 2/2009 | Danford et al. |
| 2009/0080650 A1 * | 3/2009 | Selgas .................. H04L 63/061 380/44 |
| 2009/0086964 A1 * | 4/2009 | Agrawal .................. G06F 21/10 380/44 |
| 2009/0144632 A1 | 6/2009 | Mendez |
| 2009/0198997 A1 | 8/2009 | Yeap et al. |
| 2009/0203375 A1 | 8/2009 | Gisby et al. |
| 2009/0260064 A1 | 10/2009 | McDowell et al. |
| 2009/0287921 A1 * | 11/2009 | Zhu .................. G06Q 10/02 713/155 |

(56) References Cited

U.S. PATENT DOCUMENTS

| | | |
|---|---|---|
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |
| 2010/0005195 A1 | 1/2010 | Mendez et al. |
| 2010/0023630 A1 | 1/2010 | Mendez et al. |
| 2010/0064354 A1* | 3/2010 | Irvine ............... G06F 21/6218 726/5 |
| 2010/0083359 A1 | 4/2010 | Readshaw et al. |
| 2010/0087144 A1* | 4/2010 | Korenshtein ......... H04B 17/318 455/41.2 |
| 2010/0094981 A1* | 4/2010 | Cordray ............... G06F 15/177 709/222 |
| 2010/0100641 A1 | 4/2010 | Quinlan et al. |
| 2010/0120450 A1 | 5/2010 | Herz |
| 2010/0138667 A1 | 6/2010 | Adams et al. |
| 2010/0144323 A1 | 6/2010 | Collins et al. |
| 2010/0146269 A1 | 6/2010 | Baskaran |
| 2010/0222645 A1 | 9/2010 | Nadler et al. |
| 2010/0254410 A1 | 10/2010 | Collins |
| 2010/0257421 A1* | 10/2010 | Kohno ................. H04L 1/0014 714/748 |
| 2010/0262828 A1* | 10/2010 | Brown ................. H04L 9/0844 713/171 |
| 2010/0262829 A1* | 10/2010 | Brown ................. H04L 63/061 713/171 |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2011/0004941 A1 | 1/2011 | Mendez et al. |
| 2011/0039506 A1 | 2/2011 | Lindahl et al. |
| 2011/0082900 A1 | 4/2011 | Nagpal et al. |
| 2011/0113062 A1 | 5/2011 | Quinlan et al. |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0320552 A1 | 12/2011 | Friedman et al. |
| 2011/0320819 A1* | 12/2011 | Weber ................. H04L 9/3215 713/176 |
| 2012/0005578 A1 | 1/2012 | Hawkins |
| 2012/0011007 A1* | 1/2012 | Blewett ............... G06Q 20/20 705/16 |
| 2012/0015644 A1 | 1/2012 | Danford et al. |
| 2012/0102392 A1 | 4/2012 | Reesman et al. |
| 2012/0110345 A1* | 5/2012 | Pigeon ............... H04L 63/0435 713/189 |
| 2012/0198547 A1 | 8/2012 | Fredette et al. |
| 2012/0252494 A1* | 10/2012 | Parker ................. H04W 4/02 455/456.3 |
| 2012/0272287 A1* | 10/2012 | Kuhlke ................. H04W 4/206 726/1 |
| 2012/0284322 A1* | 11/2012 | Laborczfalvi ......... H04W 4/021 709/202 |
| 2013/0036459 A1* | 2/2013 | Liberman ............. H04L 9/0866 726/6 |
| 2013/0046971 A1* | 2/2013 | Lu ....................... H04L 65/1016 713/155 |
| 2013/0061307 A1 | 3/2013 | Livne |
| 2013/0152169 A1 | 6/2013 | Stuntebeck |
| 2013/0165232 A1 | 6/2013 | Nelson et al. |
| 2013/0226696 A1* | 8/2013 | Cook ................. G06Q 30/0251 705/14.49 |
| 2013/0229930 A1* | 9/2013 | Akay ................. H04W 52/0245 370/252 |
| 2013/0285855 A1* | 10/2013 | Dupray ................. G01S 19/48 342/451 |
| 2013/0304898 A1* | 11/2013 | Aggarwal ............. H04W 4/023 709/224 |
| 2014/0068717 A1* | 3/2014 | Mayes ................... G06F 21/33 726/3 |
| 2014/0073244 A1* | 3/2014 | Ko ....................... H04W 76/023 455/41.1 |
| 2014/0082501 A1 | 3/2014 | Bae et al. |
| 2014/0084067 A1* | 3/2014 | Vanderhulst ......... H04B 10/116 235/462.01 |
| 2014/0096180 A1* | 4/2014 | Negi ................... H04L 63/0492 726/1 |
| 2014/0096212 A1* | 4/2014 | Smith ................... G06F 21/34 726/7 |
| 2014/0113556 A1* | 4/2014 | Kotecha ............... H04W 76/023 455/41.2 |
| 2014/0123224 A1* | 5/2014 | Nosrati ................. H04W 12/06 726/3 |
| 2014/0143852 A1 | 5/2014 | Cottrell et al. |
| 2014/0162688 A1* | 6/2014 | Edge ..................... H04W 8/005 455/456.1 |
| 2014/0177495 A1 | 6/2014 | Mallikarjunan et al. |
| 2014/0198024 A1* | 7/2014 | Adzhigirey ........... G06F 3/0346 345/156 |
| 2014/0213179 A1* | 7/2014 | Rosenberg .......... H04W 76/023 455/41.1 |
| 2014/0214668 A1 | 7/2014 | Lotter et al. |
| 2014/0215212 A1* | 7/2014 | Dempster ........... G06F 21/6245 713/168 |
| 2014/0222504 A1* | 8/2014 | Mackenzie ............ G06Q 10/10 705/7.29 |
| 2014/0223177 A1* | 8/2014 | Dempster ........... G06F 21/6245 713/165 |
| 2014/0230038 A1* | 8/2014 | Leong ................. H04L 9/3215 726/7 |
| 2014/0237235 A1* | 8/2014 | Kuno ................... H04L 9/0866 713/165 |
| 2014/0237614 A1* | 8/2014 | Irvine ................. G06F 21/6218 726/26 |
| 2014/0282877 A1* | 9/2014 | Mahaffey ............. H04L 63/0853 726/3 |
| 2014/0287688 A1* | 9/2014 | Dempster ............. H04W 8/005 455/41.2 |
| 2015/0163336 A1* | 6/2015 | Ramos ..................... H04R 3/00 367/137 |
| 2015/0207795 A1 | 7/2015 | Wentz et al. |

FOREIGN PATENT DOCUMENTS

| | | |
|---|---|---|
| GB | 2361558 | 10/2001 |
| WO | 9600485 | 1/1996 |
| WO | 0241661 A2 | 5/2002 |
| WO | WO2010052669 | 5/2010 |

OTHER PUBLICATIONS

Asynchrony Software, Inc., , "PDA Defense User Guide", 726, 2002.

Belani, Eshwar et al., "The Crisis Wide Area Security Architecture", 726, 1998.

Benaloh, Josh et al., "Patient Controlled Encryption: Ensuring Privacy of Electronic Medical Records", 726, Nov. 13, 2009.

Fox, Armando et al., "Security on the Move: Indirect Authentication Using Kerberos", 726, 1996.

Menaria, Pankaj et al., "Security in Mobile Database Systems", 707, 726, Mar. 17, 2011.

Pfitzmann, Andreas et al., "Mobile User Devices and Security Modules: Design for Trustworthiness", 726, Feb. 5, 1996.

Steiner, Jennifer , "Kerberos: An Authentication Service for Open Network Systems", 726, Jan. 12, 1988.

Strunk, John et al., "Self-Securing Storage: Protecting Data in Compromised Systems", Symposium on Operating Systems Design and Implementation, 726, 2000.

Office Action for U.S. Appl. No. 13/841,853 mailed on Jan. 28, 2015.

Office Action mailed Jul. 9, 2015 in U.S. Appl. No. 13/841,853, filed Mar. 15, 2013.

(56) References Cited

OTHER PUBLICATIONS

Office Action mailed Dec. 16, 2015 for U.S. Appl. No. 14/579,314.

Office Action mailed Nov. 30, 2015 for U.S. Appl. No. 13/841,853.
Office Action mailed May 6, 2016 for U.S. Appl. No. 14/579,314.

* cited by examiner

SECONDARY DEVICE AS KEY FOR AUTHORIZING ACCESS TO RESOURCES

RELATED APPLICATION

This application is a Continuation-in-Part of U.S. patent application Ser. No. 13/841,853, filed on Mar. 15, 2013, which is hereby incorporated by reference in its entirety.

BACKGROUND

Managing access to enterprise resources by network-connected devices is critical to ensure that only authenticated and authorized users and devices gain access to sensitive information or services. To date, this has typically been accomplished by utilizing network firewalls, reverse proxy servers with authentication, and encrypted VPN tunnels. Today, however, enterprise resources are being moved out of enterprise-managed data centers and into the "Cloud." These cloud-based network environments may not provide the configurability and customization necessary to sufficiently protect enterprise resources. For instance, protecting enterprise-managed data centers at a device level can be problematic. Cloud-based data services often do not provide the necessary features to allow enterprises to manage access to the services at a device level.

SUMMARY OF THE INVENTION

The disclosed embodiments relate to a system and associated devices and methods for managing access to resources in a networked environment. A client side application executed on a client device may transmit a request to an authorization service for access to a resource. The authorization service may then authenticate user credentials and/or a device identifier received from the client side application. Authenticating the user credentials and/or the device identifier may include determining that the user credentials and/or the device identifier is/are associated with the resource.

The client side application may then receive from the authorization service an indication that the client device must comply with a distribution rule associated with the resource, where the distribution rule requires a specified secondary client device to be in communication with the client device as a prerequisite to accessing the resource. In some cases, the fact that the specified secondary client device is in communication with the client device is all that is required to authorize the client side application (with the user and/or client device having been previously authenticated) to access the resource, which may be accessed by the client device from an enterprise server or from the local memory of the client device.

In some embodiments the client side application determines that the client device complies with the distribution rule and then communicates with the secondary client device to gain access to the secure copy of the resource. In some cases this involves the client side application receiving from the secondary client device an authorization credential to be used for receiving authorization to access the resource. In some embodiments, the client side application may transmit the authorization credential to a distribution service that will provide authorization to access the resource upon authenticating the authorization credential.

In some embodiments, the resource is stored in a secure format in a memory of the client device and the authorization credential received from the secondary client device is used to access the resource from the memory. The secondary client device may receive the authorization credential from the authorization service after the authorization service authenticates user credentials and/or a device identifier received from the secondary client device. This authentication may include determining that the user credentials and/or the device identifier received from the secondary client device is/are associated with the resource. In some embodiments, the authorization service further determines whether the secondary client device complies with additional distribution rules associated with the resources and/or the authorization credential. The authorization credential may be at least one of a PIN, a key, a password, a certificate, and a token.

In some embodiments the client device may transmit the secure resource to the secondary device and receive an accessible copy of the resource from the secondary client device. Again, the secondary client device may receive the authorization credential required for accessing secure resource from the authorization service. Alternatively, the authorization credential may be provisioned in the secondary client device.

BRIEF DESCRIPTION OF THE DRAWINGS

Many aspects of the present disclosure can be better understood with reference to the following diagrams. The drawings are not necessarily to scale, emphasis instead being placed upon clearly illustrating certain features of the disclosure. Moreover, in the drawings, like reference numerals designate corresponding parts throughout the several views.

DETAILED DESCRIPTION

Disclosed are various embodiments for a system and associated devices and methods for managing access to resources in a networked environment. In some embodiments, the system comprises an enterprise server, a primary client device and at least one secondary client device configured as described herein. The enterprise server may store or otherwise control access to resources, such as data, databases, application programs and application files, text files, word processor files, spreadsheet files, presentation files, graphic files, audio files, photographic files, video files and/or the like. The enterprise server may execute an authorization service for determining whether to authorize access to resources. The enterprise server may also execute a distribution service for providing resources to the client device(s) or providing the client device(s) with access to resources.

In some embodiments, a user operates a primary client device and executes a client side application that attempts to access at least one resource hosted on the enterprise server. The authorization service may first attempt to authenticate user credentials associated with the user of the primary client device and/or a device identifier that uniquely identifies the primary client device. User credentials may include one or more of a user name and password, biometric data, and/or other data used to identify the user. The device identifier may be a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. Additionally, the device identifier may be represented by a unique software identifier such a token or certificate, based at least in part on the aforementioned unique hardware identifiers.

As an additional security measure, the authorization service may require a secondary client device, which may be a specific client device or one of a group of specific client devices (collectively referred to herein as a "key device") to be in communication with the primary client device as a prerequisite to accessing the requested resource(s). If the primary client device is in communication with the key device, the primary client device may then be authorized to access the resources. Alternatively, the primary client device may be required to interact with the key device to gain access to the requested resource(s), as described herein.

In some embodiments where the primary client device is required to interact with the key device to gain access to the requested resource(s), the primary client device may obtain from the key device an authorization credential, such as a decryption key, PIN, password, certificate and/or token, etc., required for access to the requested resource(s). For example, the primary client device may provide the authorization credential to the authorization service or the distribution service to gain access to the requested resource(s).

In some embodiments, the authorization service may instruct the distribution service to provide the requested resource(s) to the primary client device in an encrypted or otherwise secure format. The primary client device may obtain a decryption key or another authorization credential from the key device, which may be used to decrypt the resource(s) or otherwise access the resource(s). As another example, the primary client device may transfer the encrypted or otherwise secure resource(s) to the key device, which may decrypt or otherwise render the resource(s) accessible (unsecure) and return the unsecure resource(s) to the primary client device. In such cases, the key device may already be provisioned with a copy of the decryption key or other applicable authorization credential, or may obtain the decryption key or other authorization credential from the authorization service.

Figure 1:
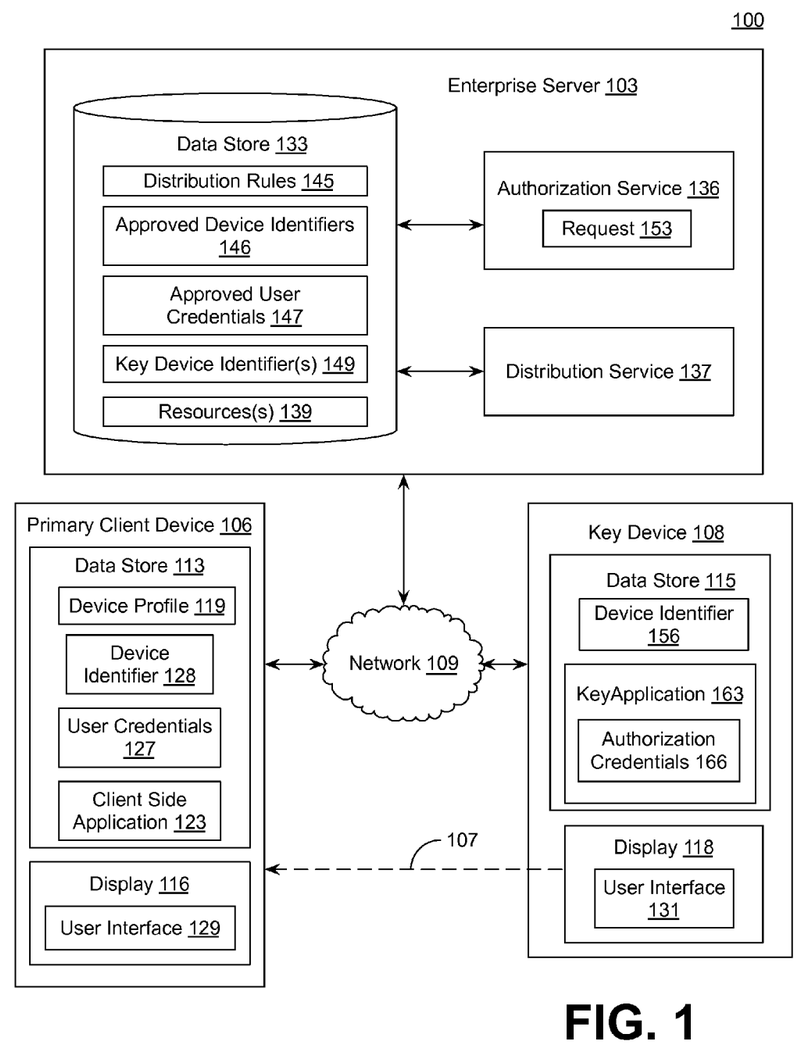
FIG. 1 is a block diagram of a networked environment according to certain embodiments.

FIG. 1 illustrates an example of networked environment 100 according to various embodiments. The networked environment 100 includes an enterprise server 103, a primary client device 106, at least one secondary client device (which functions as the key device 108) and a network 109. The network 109 may be or include, for example, any type of wireless network such as a wireless local area network (WLAN), a wireless wide area network (WWAN) or any other type of wireless network now known or later developed. Additionally, the network 109 may be or include the Internet, intranets, extranets, microwave networks, satellite communications, cellular systems, PCS, infrared communications, global area networks, or other suitable networks, etc., or any combination of two or more such networks. The network 109 facilitates transmission of communications and resources between one or more client devices 106, 108 and the enterprise server 103.

By way of example, a client device 106, 108 may be a desktop computer, a laptop computer, a personal digital assistant, a cellular telephone, a set-top box, a music player, a web pad, a tablet computer system, a game console, and/or another device with like capability. A client device 106, 108 may include a wired network connectivity component (not shown in FIG. 1), for example, an Ethernet network adapter, a modem, and/or the like. A client device 106, 108 may further include a wireless network connectivity interface (not shown in FIG. 1), for example, a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like. A client device 106, 108 may thus be operable to communicate via wired connection with the enterprise server 103 with the aid of the wired network connectivity component. A client device 106, 108 may be further operable to communicate wirelessly with the enterprise server 103 with the aid of the wireless network connectivity component.

Additionally, a client device 106, 108 may further comprise a memory for storing data and application programs, a processor for executing application programs and other executable instructions stored in the memory, and a local interface such as a bus, as will be described with respect to FIG. 5. A client device 106, 108 may also include a display 116, 118 for rendering user interfaces 129, 131. The memory of the client device 106, 108 may contain a data store 113, 115. In certain embodiments, the data store 113, 115 may store certain data and application programs. In the case of the primary client device 106 and for purposes of the present discussion, the data store 113 may store a device profile 119, user credentials 127, a device identifier 128, an application program for accessing and managing access to resources (referred to herein as a "client side application" 123), as well as other application programs and data. In the case of the key device 108 and for purposes of the present discussion, the data store 115 may store a device identifier 156, an application program for enabling or facilitating access to resources (referred to herein as a "key application" 163), as well as other application programs and data.

The device profile 119 may indicate various hardware, software, and security attributes or other configurations of the primary client device 106. For instance, the device profile 119 may indicate hardware specifications of the primary client device 106, version and configuration information of various software programs and hardware components installed, enabled and/or executing on the primary client device 106, transport protocols enabled on the primary client device 106, version and usage information of various other resources stored on the primary client device 106, and/or any other attributes associated with the state of the primary client device 106. The information included in the device profile 119 and other data stored on or accessible to the primary client device may be used to verify that the primary client device 106 complies with one or more distribution rule(s) 145 that may be associated with certain resources 139.

Distribution rules 145 may specify certain hardware, software and other device parameters or configurations with which the primary client device 106 or any other client device must comply before it will be authorized to access any resources 139 associated with such distribution rules 145. In some embodiments, a distribution rule 145 associated with a resource 139 may specify that the primary client device 106 must be in communication with a key device 108 as a prerequisite to the client side application 123 or any other application program executed by the primary client device 106 gaining access to that resource 139. For example, the resource 139 may not be provided or made accessible to the client side application 123 unless and until compliance with the distribution rule 145 is confirmed.

In some embodiments, the client side application 123 will be authorized to access the resource 139 as long as the primary client device 106 is in communication with the key device 108. The authorization service 136 may facilitate access to the resource 139 by the client side application 123, for example via the distribution service 137. Alternatively, the authorization service 136 or may authorize or enable the client side application 123 to access the resource 139 from the local memory of the primary client device.

As used herein the phrase "in communication" is meant in its broadest sense, i.e., that at least one signal transmitted by one device is received by another device. An active two-way communication session is not required. Thus, for instance, one client device (e.g., the key device 108) may broadcast a beacon or some other self-identifying signal that may be received by another device (e.g., the primary client device 106) and, in the context of this disclosure, the devices are considered to be in communication with each other. Therefore, the client side application 123 may simply search a listing of potential Bluetooth or proximity based communication pairings, etc. to confirm that the specified key device 108 is broadcasting a signal and is within the presence of the primary client device 106. Therefore, based on the detected presence of the key device 108, the client side application 123 may confirm compliance with the distribution rule 145 and thereby gain access to the resource 139.

In some embodiments, the client side application 123 will be required to interact with the secondary client device 106 to gain access to the resource 139. For example, the client side application 123 may receive an authorization credential 166 from a key application 163 executed on the key device 108 and may then provide it to the distribution service 137 or authorization service 136. As another example, the resource 139 may be provided to the client side application 123 in a secure format (e.g., encrypted, password protected, etc.) and the client side application 123 will be required to cooperate with the key application 163 executed by the key device 108 to gain access to the secure resource 139. The key application 163 may be configured for retrieving applicable authorization credentials (e.g., decryption keys, PINs, passwords, certificates, and/or tokens, etc.) from the data store 115 of the key device 108 or may request such items from the authorization service 136 as needed.

In some embodiments, the client side application 123 may be executed to transmit to the enterprise server 103 a request 153 for access to at least one resource 139. The client side application 123 may also include functionality for rendering a user interface 129 on the display 116 and for displaying resources 139 therein. In some embodiments, the client side application 123 may render an interface that presents an array of resources 139 in a single view, such as in a category-based tree or outline format. As will be appreciated, the client side application 123 may also include functionality for receiving and responding to user input commands generated by various input/output devices.

In some embodiments, the client side application 123 may be a secure container program that may be authorized to receive and render selected resources 139. The secure container program may also execute other application programs within its secure environment, where such application programs are stored locally on the client device 106 and/or on the enterprise server 103 or another network device. By way of example, such other applications may include web browsing applications, email applications, instant messaging applications, and/or other applications capable of receiving and/or rendering resources 139 on the display 116.

In some embodiments, where the client side application 123 is not a secure container program, the client side application 123 may be configured with instructions for communicating with and executing commands received from the authorization service 136 for performing the authorization methods described herein. Such instructions may be included in or called by the program code of the client side application 123 or may be provided by a wrapper applied to the client side application 123.

In some embodiments, key device 108 may continuously and/or periodically broadcast an authorization indication (such as a location identifier and/or key device identifier 156) via network 109. In some embodiments, key device 108 may provide such an authorization indication to primary client device 106 upon a manually triggered request from a user of primary client device 106 and/or upon detection of primary client device 106 within a configurable proximity to key device 108 and/or a geographic location served by key device 108. Client device 106 may then create a registration key according to various criteria, such as the authorization indication, user credentials 127, and/or device characteristic and properties, such as primary client device identifier 128. This registration key may then be provided to enterprise server 103 and/or key device 108 in order to register the primary client device 106 for access to resource(s) 139. Such registration may comprise entry of the registration key in a registration database or other tracking table and may require evaluation of the primary client device 106 with respect to compliance rules and/or distribution rules 145. Once the registration key has been entered and approved, authorization credentials 166 may be provided to primary client device 106 to enable access to resource(s) 139.

In some embodiments, the compliance of primary client device 106 with the application compliance and/or distribution rules 133 may be evaluated on a periodic basis and/or each time primary client device 106 requests access to resource(s) 139. In some embodiments, the authorization credentials may comprise compliance restrictions such as a requirement for primary client device 106 to remain within a configurable proximity of key device 108 in order to continue and/or request further access to resource(s) 139. In some embodiments, the authorization credentials 166 may comprise an expiration time; such an expiration time may comprise a fixed time and/or date that the authorization credentials 166 expire and/or a duration of time from the provision of the authorization credentials 166.

The enterprise server 103 may comprise, for example, a server computer or any other system providing and authorizing access to resources 139. Alternatively, a plurality of enterprise servers 103 may be employed that are arranged, for example, in one or more server banks or computer banks or other arrangements. For example, a plurality of enterprise servers 103 together may comprise a cloud computing resource, a grid computing resource, and/or any other distributed computing arrangement. Such enterprise servers 103 may be located in a single installation or may be distributed among many different geographic locations. For purposes of convenience, the enterprise server 103 is referred to herein in the singular. Even though the enterprise server 103 is referred to in the singular, it is understood that a plurality of enterprise servers 103 may be employed in the arrangements as descried herein.

The enterprise server 103 may execute various application programs, services and other processes. For example the enterprise server 103 may execute the authorization service 136 and a distribution service 137 that distributes resources 139 to client devices 106 or otherwise provides client devices 106 with access to resources 139. It should be understood that in some embodiments, the authorization service 136 may be executed on one or more other network devices, such as a proxy server and/or a compliance server. It should also be understood that, in some embodiments, the functions of and processes performed by the authorization service 136 described herein may be distributed among a plurality of different services, including an authentication service for authenticating user and device credentials and/or a compliance service for determining whether primary client device 106 and other client devices (e.g., the key device 108) complies with resource distribution rules and other requirements.

Also, certain data may be stored in a data store 133 that is contained in or otherwise accessible to the enterprise server 103. The illustrated data store 133 may be representative of a plurality of data stores, as can be appreciated. The data store 133 may utilize strong encryption standards to protect against unauthorized access. For example, the data store 133 may utilize the Advanced Encryption Standard (AES-256) or Standard Hash Algorithm (SHA-1) or any similar strong encryption standard commonly utilized for server-side data storage.

In some embodiments, the data stored in the data store 133 includes resources 139, a listing of approved device identifiers 146, a listing of approved user credentials 147, a listing of key device identifiers 149 and distribution rules 145. The approved user credentials 147 represents user credentials that have been previously approved for accessing certain resources 139. Similarly, the listing of approved device identifiers 146 represents a listing of device identifiers that have been previously approved for accessing certain resources 139. Accordingly, user credentials 127 and device identifiers 128 received from the primary client device 106 (i.e., in connection with requests 153 for access to resources 139) are authenticated by comparing them to the listing of approved user credentials 147 and the listing of approved device identifiers 146, respectively. In some embodiments, the data store 133 may store a listing of approved pairings of user credential and identifiers and the authentication process may involve determining whether the user credentials 127 and the device identifiers 128 received from primary client device 106 match any of the approved pairings. As will be appreciated, the key device 108 and/or its user may be authenticated in the same way.

The listing of key device identifiers 149 represents a listing of key devices that may be required to be in communication with the primary client device 106 in order to "unlock" access to certain resources 139. In the example where a primary client device 106 is a laptop computer or a tablet computer, a key device 108 may be, for instance, the user's mobile phone. Any secondary client device capable of executing the key application 163 for obtaining and providing authorization credentials 166 and/or accessing secure resources may function as the key device 108. In some embodiments, a service provider or network administrator responsible for maintaining the security of the resources 139 on the enterprise server 103 may specify which secondary client device(s) may function as the key device 108 for a particular user and/or primary client device 106. In some embodiments, more than one key device 108 may be specified and/or required for compliance with a distribution rule 145.

Accordingly, the authorization service 136 may receive from the primary client device 106 a request 153 to access certain resources 139. In some embodiments, the request 153 may include or be sent along with user credentials 127, a device identifier 128 and/or an indication of the requested resource(s) 139. In some embodiments, the authorization service 136 may request some or all of such information from the primary client device 106 in response to receiving the access request 153. The authorization service 136 authenticates the user credentials 127 and/or the device identifier 128, as described.

As discussed, the authorization service 136 may also require the primary client device 106 to comply with certain distribution rules 145 before it authorizes the primary client device 106 to access the requested resource(s) 139. The information required for the compliance check may be included, for example, in the device profile 119 or otherwise stored in the data store 113 of the primary client device 106. In some cases, the information required for this compliance check may be provided by the primary client device 106 to the authorization service 136 as part of or along with the access request 153. In some cases, the authorization service 136 may request such information from the primary client device 106 when requesting user credentials 127 and/or the device identifier 128 or in response to authenticating the user credentials 127 and/or the device identifier 128.

In some embodiments, one or more distribution rules 145 or associated key device identifiers 149 may be provided to the primary client device 106 so that an application program (e.g., the client side application 123) or other process executed by the primary client device 106 may perform the compliance check. In these embodiments, the requested resource(s) 139 may not be provided to or otherwise made accessible to the primary client device 106 until the authorization service 136 receives a notice from the primary client device 106 confirming compliance. In other cases, the requested resource(s) 139 may be provided to or accessed by the primary client device 106 in a secure format before the compliance check is performed (e.g., the applicable distribution rule(s) 145 or key device identifier(s) 149 may be provided contemporaneously with the secure resource(s) 139), but the client side application 123 or other application executed by the primary client device 106 may not have the authorization credential 166 required to access or use the resource(s) 139.

A distribution rule 145 associated with at least one requested resource 139 may specify that a key device 108 (which may be identified by a key device identifier 149) must be in communication with the primary client device as a prerequisite to accessing the requested resource(s) 139. In some embodiments, the client side application 123 or another process executed by the primary client device 106 may be configured for receiving the distribution rule 145 or key device identifier 149 and determining whether the specified key device 108 is in communication with the primary client device 106. Communication between the key device 108 and the primary client device 106 may be via any suitable wired or wireless network 109 or any direct wired or wireless communication link 107 between the devices. For example, a direct wireless connection 107 may be achieved WiFi, Bluetooth, infrared signal exchanges, Near Field Communication, or any other suitable direct wireless communication link.

In some embodiments, the authorization service 136 may instruct the distribution service 137 to provide the resource(s) 139 in a secure format or provide access to the secure resource(s) 139 to the client side application 123 contemporaneously with the distribution rule 145 or key device identifier 149. In such cases, the client side application 123 may be configured to interact with the key application 163 executed by the key device 108 to gain access to the secure resource 139, as described. In some embodiments, the client side application 123 may be configured to receive an authorization credential 166 from the key application 163 and to provide that authorization credential 166 to the distribution service 137 or the authorization service 136 (which may pass the authorization credential to the distribution service 137 on behalf of the client side application 123) in order to gain access to the requested resource(s) 139.

Figure 2:
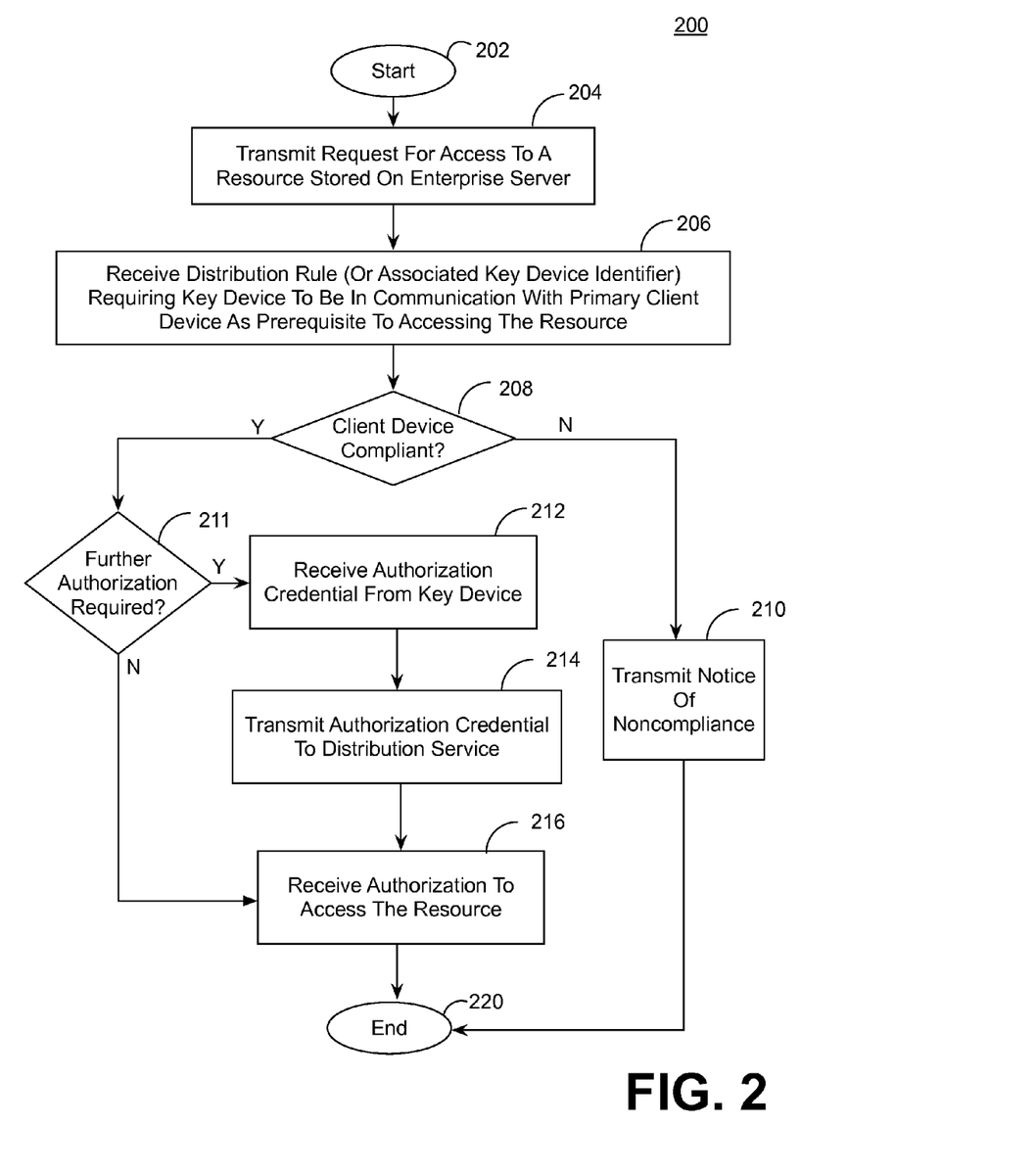
FIG. 2 is a flowchart illustrating an example of a method performed by a client side application attempting to access a resource stored on an enterprise server.

FIG. 2 is a flowchart illustrating an example of a method performed by a client side application 123 attempting to access a resource 139. The method begins at start step 202, where the client side application 123 is executed and determines (e.g., in response to a user input command or other run-time requirement) that it requires access to one or more resources 139, which may be stored on the enterprise server 103 or locally on the primary client device 106. At step 204, the client side application 123 transmits a request 153 to the enterprise server 103 (or directly to the authorization service 139, for example, in cases where its port is known to the client side application 123 or other process executed by the primary client device 106) for access to the required resource(s) 139. The request may include user credentials 127, a device identifier 128 and/or an indication of the resource(s) 139 to which access is requested.

Provided that the user and/or the client device 106 have been authenticated by the authorization service 136, the method moves to step 206, where the client side application 123 receives a distribution rule 145 (or the key device identifier 149 associated therewith), requiring confirmation that a key device 108 is in communication with the primary client device 106.

Next, in step 208, the client side application 123 determines whether the specified key device 108 is in communication with the primary client device 106. This of course may be done by checking all active communication ports, communication links, and potential communication pairings, etc. to determine the identity (e.g., by way of device identifiers) of any device in communication with the primary client device 106. In some embodiments, the client side application 123 or other process executed by the primary client device 106 determines that the primary client device 106 is in communication with the key device 108 by matching the key device identifier 149 with the device identifier 156 of the key device 108. If it is determined in step 208 that the primary client device 106 is not in compliance with the distribution rule 145, the method moves to step 210 where a notice of noncompliance is transmitted to the authorization service 136 (and may be displayed on the display 116 for the user). From step 210, the method ends at step 220.

However, if it is determined in step 208 that the primary client device 106 is in compliance with the distribution rule 145, the method proceeds to step 211, where a determination is made as to whether further authorization is required for the client side application 123 to access the resource(s) 139. For example, compliance with the distribution rule 145 may require only that the primary client device 106 is in communication with the key device 108 and, if that is confirmed, the authorization service 136 may provide authorization for the client side application 123 to access the resource(s) 139. In other cases, the client side application 123 may need a further authorization credential 166 to access resource(s) 139 via the distribution service 137 or to access secure resource(s) 139 stored locally on the primary client device 106.

Therefore if it is determined in step 211, that further authorization is not required, the method moves to step 216 where the client side application 123 receives authorization to access to the requested resource(s) 139. However if it is determined in step 211, that further authorization is required, the method moves to step 212, where an authorization credential 166 is received from the key device 108 (e.g., by the key application 163). As described, the authorization credential 166 may be stored in the data store 115 of the key device 108, or the key application 163 may be configured to request it from the authorization service 136. Then in step 214, the client side application 123 transmits the authorization credential 166 to the distribution service 137 or the authorization service 136 and in step 216, if the authorization credential is authenticated, receives authorization to access to the requested resource(s) 139. From step 216, the method ends at step 220.

In some embodiments, the requested resource(s) 139 may have previously been stored in the data store 113 of the primary client device 106, but the client side application 123 may not have been able to access the resource(s) until receiving authorization from the authorization service 136 or until receiving the authentication credential 166 from the key device 108, by way of above described or similar method.

In some embodiments, the state of the primary client device 106 may be modified after the client side application 123 is authorized to access certain resources 139. For example, the primary client device 106 may lose communication with the key device 108 in contravention of the applicable distribution rule 145. As another example, an unauthenticated user may log-on to the primary client device 106. Accordingly, in some embodiments, the authorization service 136 and the client side application 123 may periodically communicate in order to reconfirm authentication of the user and/or primary client device 106 and/or compliance with the applicable distribution rule 145. These subsequent authentications and/or compliance checks may be performed as described above (e.g., by the client side application 123 and/or the authentication service 136) and, in some embodiments, may be run as background processes so as to not require further input from the user. In some embodiments, the authorization granted to the client side application 123 for accessing the requested resource(s) 139 may be revoked and the resource(s) 139 may be deleted from the primary client device 106 and the key device, if applicable, whenever the primary client device 106 is determined to be noncompliant with the applicable distribution rule 145.

Figure 3:
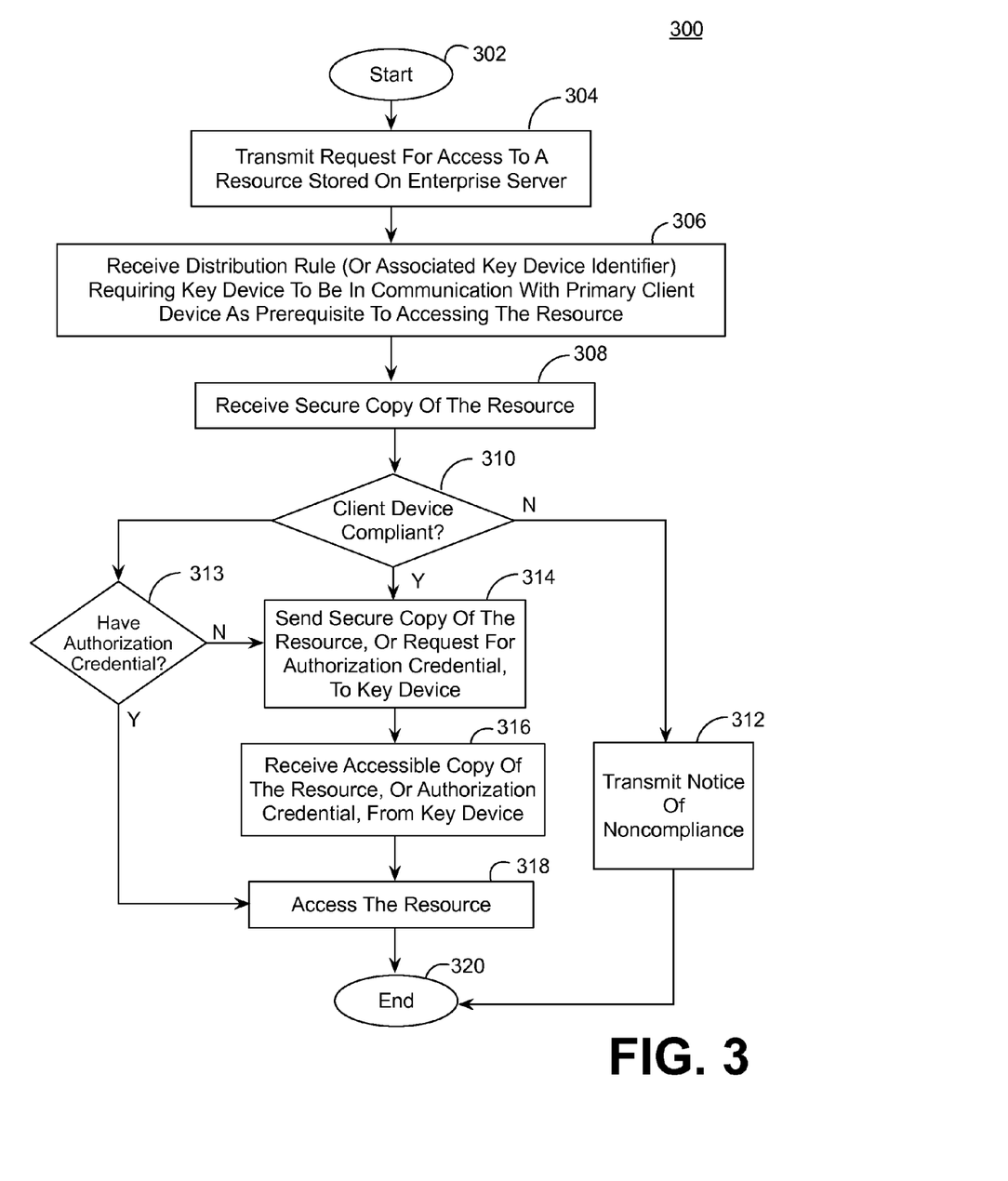
FIG. 3 is a flowchart illustrating another example of a method performed by a client side application attempting to access a resource stored on an enterprise server.

FIG. 3 is a flowchart illustrating another example of a method performed by a client side application 123 attempting to access a resource 139 stored on an enterprise server 103. The method begins at start step 302, where the client side application 123 is executed and determines (e.g., in response to a user input command or other run-time requirement) that it requires access to one or more resources 139 stored on the enterprise server 103. At step 304, the client side application 123 transmits a request 153 to the enterprise server 103 (or directly to the authorization service 139, for example, in cases where its port is known to the client side application 123 or other process executed by the primary client device 106) for access to the required resource(s) 139. The request may include user credentials 127, a device identifier 128 and/or an indication of the resource(s) 139 to which access is requested.

Provided that the user and/or the primary client device 106 have been authenticated by the authorization service 136, the method moves to step 306, where the client side application 123 receives a distribution rule 145 (or the key device identifier 149 associated therewith), requiring confirmation that a key device 108 is in communication with the primary client device 106. Then, in step 308, the client side application 123 receives the requested resource(s) 139 in a secure format.

Next, in step 310, the client side application 123 determines whether the specified key device 108 is in communication with the primary client device 106. If it is determined in step 310 that the primary client device 106 is not in compliance with the distribution rule 145, the method moves to step 312 where a notice of noncompliance is transmitted to the authorization service 136 (and may be displayed on the display 116 for the user). From step 312, the method ends at step 320. However, if it is determined in step 310 that the primary client device 106 is in compliance with the distribution rule 145, the method proceeds to step 313, where a determination is made as to whether the client side application 123 has access to the authorization credential 166 required for accessing the secure resource 139. For example, the authorization credential 166 may be stored locally on the primary client device. If so, the method moves to step 318, where the client side application 123 uses the required authorization credential 166 to access the resource 139. If it is determined at step 313 that the client side application 123 does not have access to the authorization credential 166, the method proceeds to step 314, where secure resource(s) 139, or a request for the authorization credential 166, is transmitted to the key device 108.

As discussed, the key application 163 executed on the key device 108 may retrieve the applicable authorization credential 166 from the local data store 115 or may obtain it (or them) from the authorization service 136. In the case where the secure resource(s) 139 are provided to the key device 108, the key application 163 will use the applicable authorization credential 166 to render the resource(s) 139 accessible (unsecure). Therefore, in step 316, the client side application 123 receives either the accessible resource(s) 139, or the applicable authorization credential 166, from the key application 163. Then at step 318 that client side application 123 accesses the resource(s) 139 and, from there, the method ends at step 320.

As in the prior example method, in some embodiments, the authorization service 136 and the client side application 123 may periodically communicate in order to reconfirm authentication of the user and/or primary client device 106 and/or compliance with the applicable distribution rule 145. These subsequent authentications and/or compliance checks may be performed as described above (e.g., by the client side application 123 and/or the authentication service 136) and, in some embodiments, may be run as background processes so as to not require further input from the user. In some embodiments, the authorization granted to the client side application 123 for accessing the requested resource(s) 139 may be revoked and the resource(s) 139 may be deleted from the primary client device 106 whenever the primary client device 106 is determined to be noncompliant with the applicable distribution rule 145. In addition, in some embodiments, any and all copies of resource(s) 139 provided to the key device 108 may be removed from the key device 108 (e.g., by a function of the key application 163) after the key application 163 decrypts or renders them accessible and provides them back to the primary client device 106.

Figure 4:
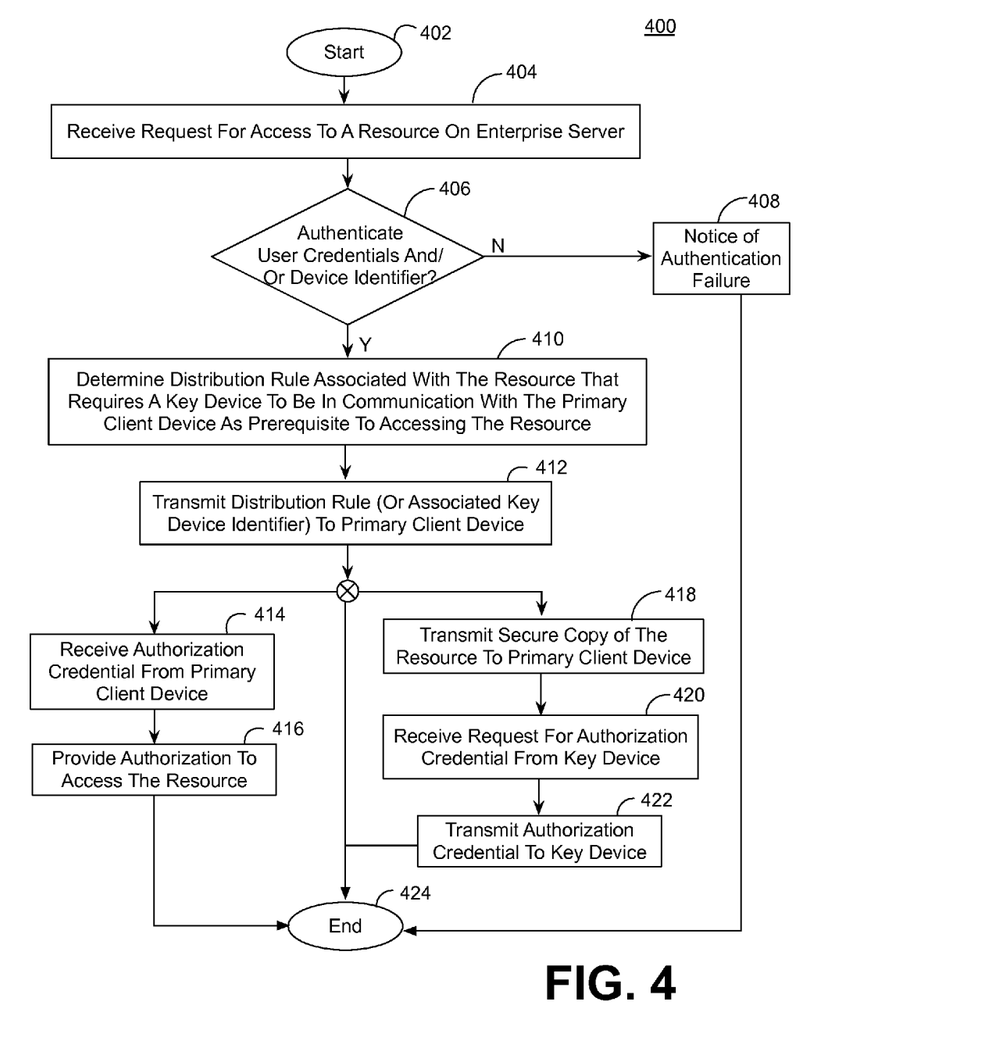
FIG. 4 is a flowchart illustrating an example of a method performed by an authorization service for authorizing or denying access to resources.

FIG. 4 is a flowchart illustrating an example of a method performed by an authorization service 136 for authorizing or denying access to resource(s) 139 stored on an enterprise server 103. From start step 402 the method moves to step 404, where the authorization service 136 receives a request 153 from a client side application 136 to access certain resource(s) 139 hosted by the enterprise server 103. As described, user credentials 127, a device identifier 128 and/or an indication of the requested resource(s) 139 may be included in or sent along with the access request 153. Alternatively, the authorization service 136 may request some or all of that information in response to receiving the access request 153.

Next, in step 406, the authorization service 136 determines whether the user credentials 127 and/or the device identifier 128 is/are authenticated. As described, this authentication step may involve not only determining that the user credentials 127 and/or the device identifier 128 is/are valid, but also determining if the user credentials 127 and/or the device identifier 128 is/are associated with the requested resource(s) 139. If not, the method moves to step 408 where a notification of authentication failure is transmitted to the client side application 123 and then the method ends at step 320. However, if the user credentials 127 and/or the device identifier 128 is/are authenticated in step 408, the method proceeds to step 410, where at least one distribution rule 145 associated with the requested resource(s) 139 is identified and such distribution rule(s) 145 require(s) at least one key device 108 be in communication with the primary client device 106 as a prerequisite to accessing the requested resource(s) 139.

Next in step 412, the distribution rule(s) 145 or key device identifier(s) 149 are transmitted to the client side application 123 or other process executed on the client device 106 so that the compliance check can be performed locally on the client device 106. The distribution rule 145 may further specify whether (i) no further authorization is required for the client side application 123 to access the requested resource(s) 139, (ii) requested resource(s) 139 are to remain on the enterprise server 103 until the client side application 123 provides a valid authorization credential 166, or (iii) whether the requested resource(s) 139 are to be provided to the client side application 123 in a secure format. If no further authorization is required, the method ends at step 424 and the client device 106 will be authorized to access the resource(s) 139.

If the requested resource(s) 139 are to remain on the enterprise server 103 until the client side application 123 provides a valid authorization credential 166, the method moves to step 414, where the authorization service 136 receives an authorization credential 166 from the client side application 123. Then at step 416, the authorization service 136 provides or facilitates the provision of authorization to access the requested resource(s) 139, for example by authenticating the authorization credential 166 or by transferring the authorization credential 166 to the distribution service 137 for authentication. From step 416 the method ends at step 424. As previously mentioned, the client side application 123 in some embodiments will provide an authorization credential 166 directly to the distribution service 137, meaning that steps 414 and 416 will not be performed.

Returning to step 412, if the distribution rule 145 indicates that the requested resource(s) 139 are to be provided to the client side application 123 in a secure format, the method moves to at step 418, where that action is performed. Then at step 420, the authorization service 136 receives from the key device 108 a request for an authorization credential 166 required for rendering accessible the secure resource(s) 139. At step 422 the requested authorization credential 166 is provided to the key device 108, preferably in response to authenticating user credentials and/or a device identifier 156 associated with the key device 108. For example the user may be prompted to input user credentials 127 to the key device 108 (e.g., via a user interface 131 of the key application 163), which may be transmitted to the authorization service 136, possibly along with the device identifier 156 of the key device 108. In some embodiments, the authorization service 136 will require the key device 108 to comply with additional distribution rules 145 associated with the resource(s) 139 and/or the key device 108. Following step 422, the method ends at step 424.

Figure 5:
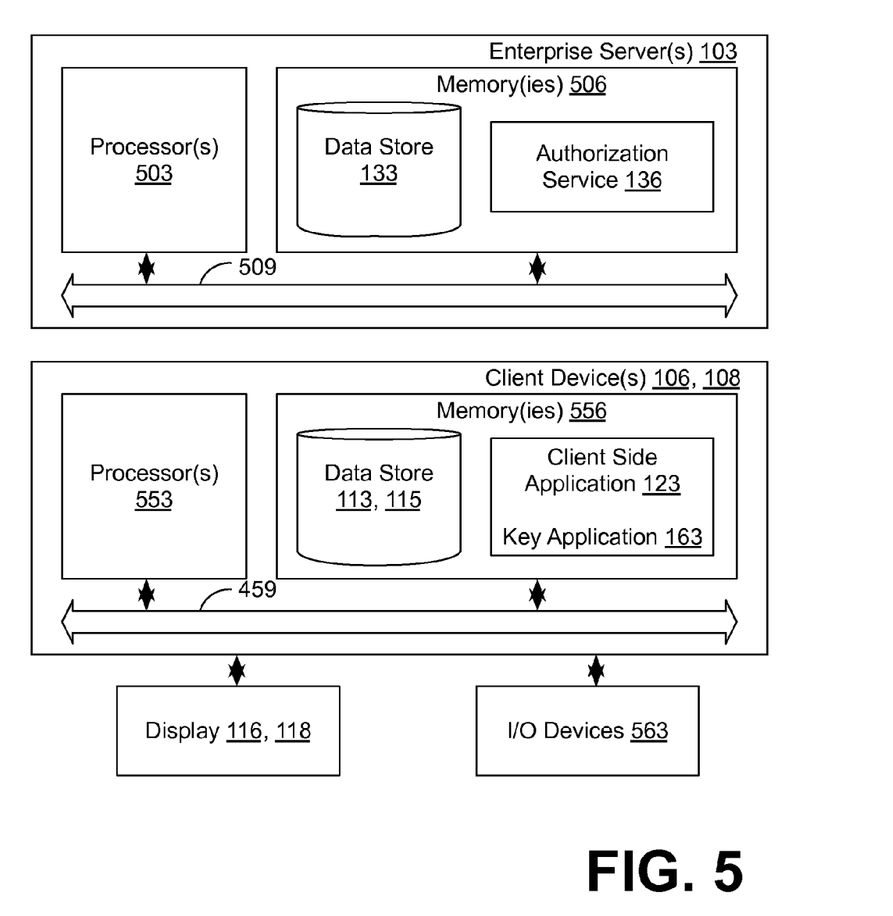
FIG. 5 shows schematic block diagrams illustrating certain components of an enterprise server and a client device employed in the networked environment of FIG.

FIG. 5 shows schematic block diagrams illustrating certain components of an enterprise server 103 and each of the client devices 106, 108 employed in the networked environment of FIG. 1. The enterprise server 103 includes at least one processor circuit, for example, having a processor 503 and a memory 506, both of which are coupled to a local interface 509. To this end, the enterprise server 103 may comprise, for example, at least one server computer or like device. Similarly, the each of client devices 106, 108 includes at least one processor circuit, for example, having a processor 553 and a memory 556, both of which are coupled to a local interface 559. Additionally, each of the client devices 106, 108 may be in data communication with a display 116, 118 for rendering user interfaces 129, 131 (FIG. 1) and one or more other I/O devices 563 for inputting and outputting data. To this end, each of the client devices 106, 108 may comprise, for example, at least one client computer or like device.

The following is a general discussion of the components of the enterprise server 103 and each of the client devices 106, 108. The local interface 509 and 559 may comprise, for example, a data bus with an accompanying address/control bus or other bus structure as can be appreciated. Stored in the memory 506 and 556 are both data and several components that are executable by the processors 503 and 553. In particular, with regard to the enterprise server 103, stored in the memory 506 and executable by the processor 503 are an authorization service 139 and potentially other applications. Additionally, with regard to each of the client devices 106, 108 stored in the memory 556 and executable by the processor 553 are a client side application 123 or a key application 163 and potentially other applications. Also stored in the memory 506 and 556 may be a data store 133 and 113, 115 and other data. In addition, an operating system may be stored in the memory 506 and 556 and executable by the processor 503 and 553.

It is to be understood that there may be other applications that are stored in the memory 506 and 556 and are executable by the processor 503 and 553 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and 556 and are executable by the processor 503 and 553. In this respect, the term "executable" means a program file that is in a form that can ultimately be run by the processor 503 and 553. Examples of executable programs may be, for example, a compiled program that can be translated into machine code in a format that can be loaded into a random access portion of the memory 506 and 556 and run by the processor 503 and 553, source code that may be expressed in proper format such as object code that is capable of being loaded into a random access portion of the memory 506 and 556 and executed by the processor 503 and 553, or source code that may be interpreted by another executable program to generate instructions in a random access portion of the memory 506 and 556 to be executed by the processor 503 and 553, etc. An executable program may be stored in any portion or component of the memory 506 and 556 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 and 556 are defined herein as including both volatile and nonvolatile memory and data storage components. Volatile components are those that do not retain data values upon loss of power. Nonvolatile components are those that retain data upon a loss of power. Thus, the memory 506 and 556 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 and 553 may represent multiple processors, and the memory 506 and 556 may represent multiple memories that operate in parallel processing circuits, respectively. In such a case, the local interface 509 and 559 may be an appropriate network 109 (FIG. 1) that facilitates communication between any two of the multiple processors 503 and 553, or between any two of the memories 506 and 556, etc. The local interface 509 and 559 may comprise additional systems designed to coordinate this communication, including, for example, performing load balancing. The processor 503 and 553 may be of electrical or of some other available construction.

Although the authorization service 136, distribution service 137, client side application 123, key application 163, and other various processes and functionality described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

It is to be understood that the flowcharts of FIG. 2, FIG. 3 and FIG. 4 provide merely examples of the many different types of functional arrangements that may be employed to implement the operation of the client side application 123 and authorization service 136, respectively, as described herein. The flowcharts may also be viewed as depicting examples of methods implemented in the client device 106 and the enterprise server 103 (or other network device), respectively, according to one or more embodiments. If embodied in software, each method step or box of the flowcharts may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 and 553 in a computer system or other system. The machine code may be converted from the source code, etc. If embodied in hardware, each block may represent a circuit or a number of interconnected circuits to implement the specified logical function(s).

Although the flowcharts of FIG. 2, FIG. 3 and FIG. 4 show a specific order of execution, it is understood that the order of execution may differ from that which is depicted. For example, the order of execution of two or more steps may be scrambled relative to the order shown. Also, two or more blocks shown in succession in FIG. 2, FIG. 3 or FIG. 4 may be executed concurrently or with partial concurrence. Further, in some embodiments, one or more of the steps shown in FIG. 2, FIG. 3 or FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authorization service 136, distribution service 137, client side application 123, and key application 163, that comprises software or code can be embodied in any non-transitory computer-readable medium for use by or in connection with an instruction execution system such as, for example, a processor 503 and 553 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described and other possible embodiment(s) without departing substantially from the spirit and principles of the disclosure. All such modifications and variations are intended to be included within the scope of this disclosure and the following claims.

What is claimed is:
1. A method comprising:
  transmitting, from a device, a request to an authorization service for access to at least one resource;
  receiving from the authorization service an indication that the device must comply with a distribution rule associated with the at least one resource, wherein the distribution rule requires a specified secondary device to be in proximity to the device as a prerequisite to accessing the at least one resource;
  transmitting an indication that the device is in proximity to the secondary device;
  receiving an authorization indication at the device in response to transmitting the indication that the device is in proximity to the secondary device;
  creating a registration key based on the authorization indication, a user identifier, and a property of the device;
  determining whether access to at least one resource is permitted according to the registration key;
  obtaining an authorization credential from the secondary device, the authorization credential being associated with the at least one resource; and
  in response to determining that access to the at least one resource is permitted according to the registration key and receiving the authentication credential, permitting the device to access the at least one resource.

2. The method of claim 1, wherein the authorization indication is received in response to a user-initiated action.

3. The method of claim 1, wherein the authorization indication is received from a second device operative to transmit the authorization indication.

4. The method of claim 1, further comprising:
  receiving the authorization indication in response to determining that a compliance rule associated with the authorization indication has been satisfied.

5. The method of claim 1, wherein determining whether access to the at least one resource is permitted according to the registration key comprises:
  retrieving an identifier associated with the at least one resource;
  submitting the registration key and the identifier associated with the at least one resource to a verification service; and
  determining whether an access key for the at least one resource has been received from the verification service.

6. The method of claim 1, wherein the authorization indication comprises a unique identifier associated with the device.

7. The method of claim 1, wherein the registration key is associated with a plurality of compliance rules.

8. The method of claim 7, wherein at least one of the plurality of compliance rules comprises a required proximity between the device and at least one second device.

9. The method of claim 7, wherein at least one of the plurality of compliance rules comprises an expiration time for the registration key.

10. The method of claim 1, further comprising:
  displaying an indication on a user interface of the device associated with the registration key.

11. An apparatus comprising:
  a memory storage; and
  a processor coupled to the memory storage operative to execute instructions for:
    obtaining a request for an indication associated with access to a resource from a user device,
    determining whether the resource is associated with a distribution rule, the distribution rule specifying that the user device be in proximity to a secondary device as a prerequisite for accessing the resource,
    obtaining an indication that the user device is in proximity to the secondary device, providing an authorization indication to the user device, the authorization indication authorizing access to the resource, receiving a registration key from the user device and an authorization credential provided by the secondary device, the registration key being generated by the user device based upon the authorization indication and the authorization credential obtained from the secondary device by the user device, creating a profile for the user device according to the registration key, associating a plurality of compliance rules with the profile for the user device, receiving a request to access a resource from the user device, determining whether the user device is in compliance with the plurality of compliance rules, and in response to determining that the user device is in compliance with the plurality of compliance rules, providing access to the resource to the user device.

12. The apparatus of claim 11, wherein the processor is further operative to execute instructions for:

detecting an arrival of the user device within a geographic location served by the apparatus; and providing the authorization indication to the user device automatically.

13. The apparatus of claim 11, wherein the processor is further operative to execute instructions for:

receiving a request from the user device; and providing the authorization indication to the user device in response to the request.

14. The apparatus of claim 11, wherein the processor is further operative to execute instructions for:

providing at least one restriction on the resource to the user device.

15. A client device comprising:

a network connectivity interface for enabling communication between the client device and an authorization service via a network;

a memory for storing a client side application; and a processor communicatively coupled to the memory for executing said client side application, wherein said client side application comprises executable instructions for:

transmitting a request to an authorization service for access to at least one resource;

receiving from the authorization service an indication that the client device must comply with a distribution rule associated with the resource, wherein the distribution rule requires a second device to be in proximity to the client device as a prerequisite to accessing the at least one resource;

obtaining an authorization credential from the second device;

transmitting to the authorization service an indication that the client device is in proximity to the second device and the authorization credential;

receiving an authorization indication associated with a geographic location from the second device located within the geographic location in response to transmitting the indication that the device is in proximity to the second device;

creating a registration key based on the authorization indication, a user identifier, and a property of the client device;

providing the registration key to the second device;

determining whether the second device approved the registration key; and in response to determining that the second device approved the registration key, requesting access to the at least one resource.

16. The client device of claim 15, wherein requesting access to the at least one resource comprises providing the authorization credential to the authorization service associated with the at least one resource.

17. The client device of claim 15, wherein the authorization credential comprises at least one compliance restriction.

18. The client device of claim 15, wherein the authorization indication is received as a broadcast signal from the second device.

19. The client device of claim 15, wherein the property of the client device comprises a unique identifier associated with the client device.

* * * * *